United States Patent [19]

Shinohara et al.

[11] Patent Number: 4,879,498
[45] Date of Patent: Nov. 7, 1989

[54] DC MOTOR DRIVE SYSTEM FOR REDUCING START-UP CURRENT

[75] Inventors: Tooru Shinohara; Masahito Iwatsubo, both of Kawasaki, Japan

[73] Assignee: Fujitsu Limited, Kawasaki, Japan

[21] Appl. No.: 184,496

[22] PCT Filed: Aug. 5, 1987

[86] PCT No.: PCT/JP87/00585
§ 371 Date: Jun. 6, 1988
§ 102(e) Date: Jun. 6, 1988

[87] PCT Pub. No.: WO88/01111
PCT Pub. Date: Feb. 11, 1988

[30] Foreign Application Priority Data

Aug. 6, 1986 [JP] Japan .................................. 61-184830

[51] Int. Cl.[4] .............................................. H02P 6/02
[52] U.S. Cl. ...................................... 318/254; 318/106; 318/109; 318/138; 318/431
[58] Field of Search ............... 318/105, 106, 107, 108, 318/109, 138, 254, 345 B, 345 F, 430, 431, 432, 433, 309

[56] References Cited

U.S. PATENT DOCUMENTS

| 3,670,237 | 6/1972 | Hubel et al. | 318/431 X |
| 4,359,674 | 11/1982 | Gotou | 318/254 |
| 4,510,422 | 4/1985 | Ogura | 318/254 |
| 4,588,933 | 5/1986 | Sun | 318/254 |
| 4,603,283 | 7/1986 | Oltendorf | 318/138 X |
| 4,780,773 | 10/1988 | Hama | 318/433 |

Primary Examiner—Bentsu Ro
Attorney, Agent, or Firm—Staas & Halsey

[57] ABSTRACT

A system for driving a constant current drive type DC motor a which enables the supply of a low power to switching elements in a constant current drive circuit therein during, and in particular, at start-up of the motor. The DC motor drive system includes a DC motor, a unit for detecting a rotation of a rotor of the motor, a power supply unit for supplying a drive power to the motor, and a current drive circuit providing a constant current passing through a coil of the motor supplied with the drive power during a normal operation of the motor. The power supply unit sequentially increases a voltage therefrom in multi-steps in response to the increase of the rotation during a start-up operation. The power supply unit may change the voltage supplied therefrom so that a maximum value of the current is sequentially increased during the start-up.

26 Claims, 17 Drawing Sheets

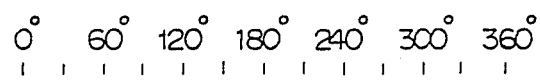
Fig. 5a $V_A - V_B$ 
Fig. 5b $V_B - V_C$ 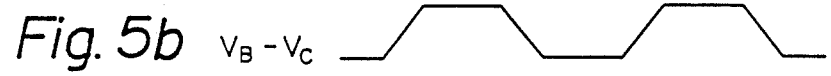
Fig. 5c $V_C - V_A$ 
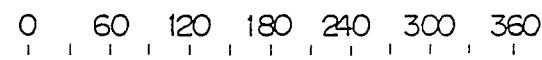
Fig. 6a $I_{2A}$ 
Fig. 6b $I_{2B}$ 
Fig. 6c $I_{2C}$ 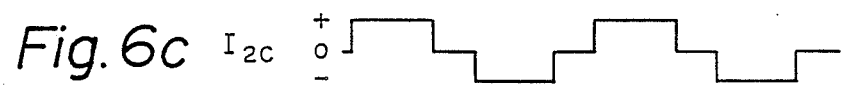

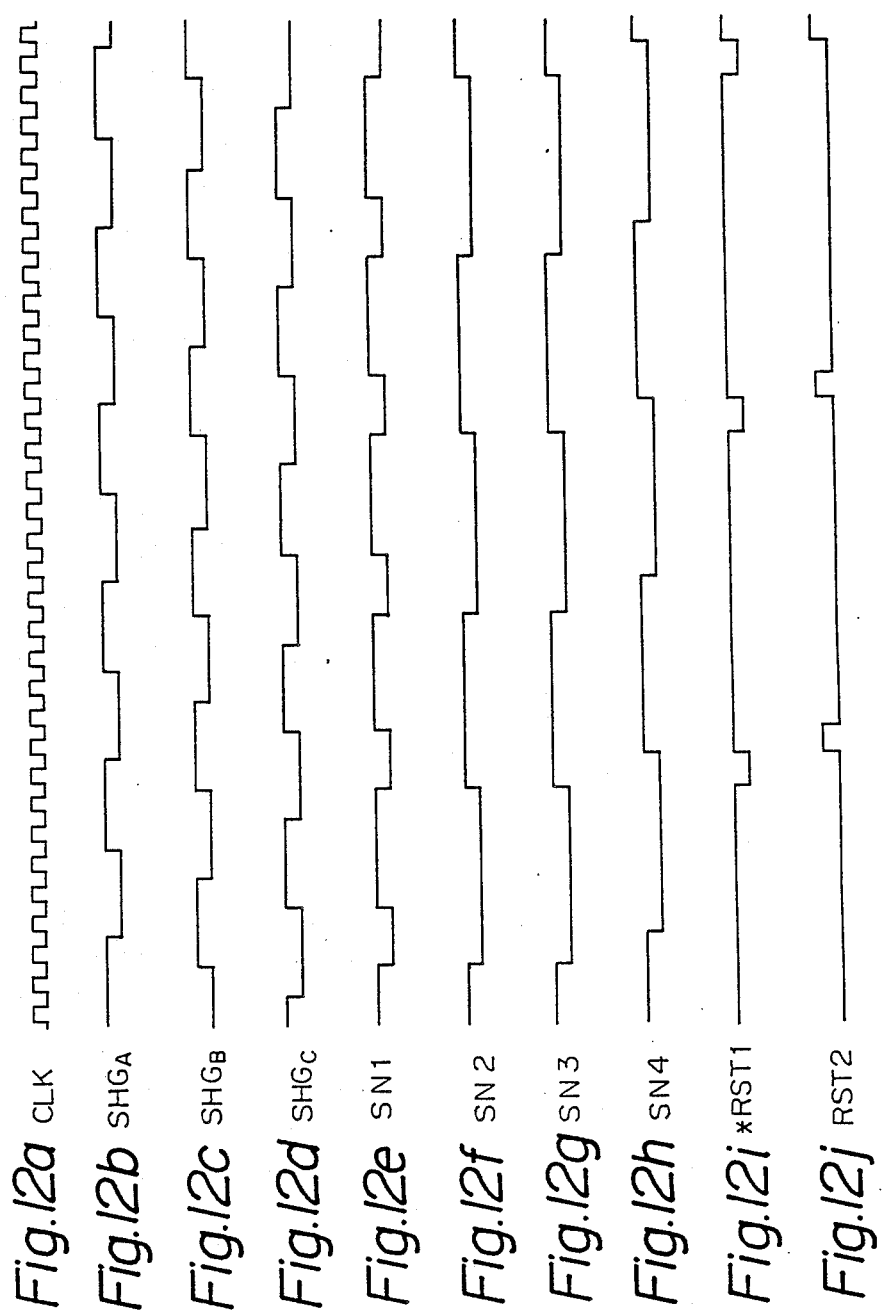

Fig.14a  Fig.14b  Fig.14c
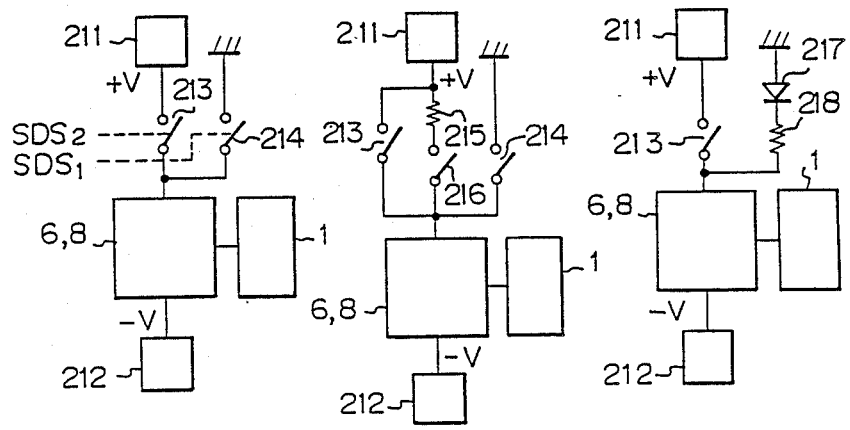
Fig.14d  Fig.14e
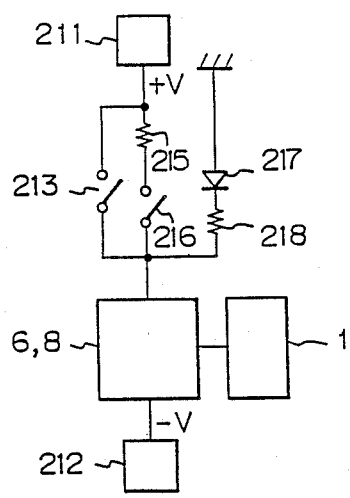
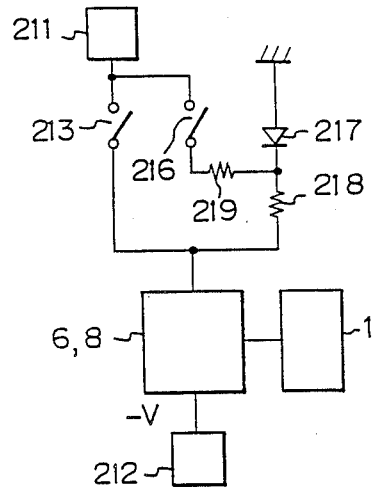

DC MOTOR DRIVE SYSTEM FOR REDUCING START-UP CURRENT

BACKGROUND OF THE INVENTION

The present invention relates to a system for driving a DC motor, more particularly, to a system for driving a DC motor employed in, for example, a large magnetic disc system for driving a spindle therein, and connected to a constant current drive circuit.

FIG. 1 is a diagram of a prior art bi-polar direct current (DC) motor drive system employing a very bulky magnetic disc system (not shown). In FIG. 1, reference 1 denotes a three-phase brushless Hall-type DC motor including three exciting coils 2A, 2B, and 2C, and Hall-effect-type sensors 3A, 3B, and 3C, 4 denotes a circuit for synthesizing outputs $SHG_A$ to $SHG_C$ from the Hall sensors 3A, 3B and 3C, 5 denotes a timing control circuit, 6 denotes a phase exchange switching circuit, 7 denotes a power supply (power source), and 8 denotes a constant current drive circuit having a phase switching function.

The phase exchange switching circuit 6 includes three power transistor type switches 6A to 6C. The constant current drive circuit 8 also includes three constant current sources 8A to 8C each having at least one power transistor.

A rotor (not shown) of the DC motor 1 is mechanically connected to a spindle (not shown) of the magnetic disc system, rotating a magnetic disc(s) (not shown) in response to the rotation of the spindle.

The rotation position of the rotor of the DC motor 1 is detected by the Hall sensors 3A to 3C. The signals $SHG_A$ to $SHG_C$ output from the Hall sensors 3A to 3C are synthesized at the signal synthesizing circuit 4, resulting in a phase signal SPHASE. The timing control circuit 5 generates timing signals $ST_A$ to $ST_C$ for energizing the power transistor switches 6A to 6C and control signals $SC_A$ to $SC_C$ for controlling the constant current sources 8A to 8C, in response to the phase signal SPHASE. As a result, series-connected exciting coils 2A and 2B, 2B and 2C, and 2C and 2A are consecutively energized in response to the phase signal SPHASE, to rotate the rotor of the DC motor 1.

Generally, the motor has a predetermined relationship between the drive power and torque (or mechanical energy). Accordingly, by controlling the drive current, the torque generated in the motor can be freely controlled. In other words, when a load on the motor is varied, the torque generated in the motor can be maintained at a predetermined constant value by supplying a constant current to the exciting coils. In addition, in the DC motor, a large start-up current may flow into the coils for a lengthy start-up time, due to a large inertia of the rotor. This basically requires a bulky and high-cost power supply for supplying sufficient start-up current during a long start-up time. When the constant current drive circuit is provided, the start-up current is very limited, enabling a reduction of the power supply. As discussed above, the constant current drive circuit 8 contributes to obtaining the above advantages. Furthermore, when the constant current drive circuit is employed for a phase-exchange-type DC motor as shown in FIG. 1, and accordingly, may include switching power transistors, the constant current drive circuit provides the phase exchange function.

Referring back to FIG. 1, in the DC motor 1, a counter-electromotive-force (emf) is induced in the exciting coils 2A to 2C during the rotation of the rotor, and the amplitude of each counter-emf is enlarged in response to an increase in that rotation. Accordingly, a voltage of the power supply 7 is designed so that it will overcome the counter-emf at a required high rate of speed, e.g., 3600 RPM, of the rotor and enable a constant current control.

The characteristics of the DC motor can be expressed by the following formula:

$$V_M = K_e \cdot R_S + L \cdot \frac{di}{dt} + r_M \cdot i \quad (1)$$

where, $V_M$: voltage supplied to the motor (V),
$K_e$: induced voltage constant (V),
$R_S$: speed of the rotor (RPM),
L: inductance of the series-connected coils (H),
$r_M$: resistance of the series-connected coils ($\Omega$) and
i: current flowing through the series-connected coils.

During the start-up operation of the motor, or at a low speed operation, the speed $R_S$ is almost zero or very low and the counter-emf is almost zero or very small. As a result, in spite of the provision of the constant current drive circuit 8, a large current is still supplied to the power transistor type switches 6A to 6C and the power transistors in the constant current sources 8A to 8C, and accordingly, these power transistors accumulate heat. The start-up time may be approximately 25 to 35 seconds when the DC motor is used for driving a large-scale magnetic disc system. Therefore, taking these conditions into consideration, high power transistors having a tolerance for a large current passing therethrough and a high temperature thereat during a lengthy start-up time must be provided. This results in the disadvantages of high cost, a bulky circuit configuration, and the installation of expensive and bulky cooling members. In addition, the probability of breakage of the power transistors is increased, reducing the reliability of the DC motor drive system. Among other elements, the power transistors of the switches 8A to 8C suffer from the latter problem, because these transistors are used in a linear region of the characteristics thereof.

A strong demand for a reduction or elimination of the above problems has arisen.

JPA No. 57-183281, published on Nov. 11, 1982, discloses a speed control circuit for a brushless DC motor. As shown in FIG. 4 of JPA No. 57-183281, the circuit avoids the application of excess power to a current control power transistor 12 during the start-up of the motor by providing a switch 25 and a resistor 23 connected to coils 13 to 15. At the start-up time, the resistor 23 consumes power from a power supply, and accordingly, causes a drop in the voltage supplied to the transistor 12 through the coils 13 to 15 and phase exchange transistors in a current drive circuit 6. After the start-up, the switch 25 is energized to bypass the resistor 23 so that a normal voltage from the power supply is supplied to the coils 13 to 15 and the transistor 12. The above energization of the switch 25 is carried out in response to a speed of the rotor.

This speed control circuit overcomes a part of the above problems, but since the above switching of the voltage-changeable supply circuit is essentially a single switching, the use of the speed control circuit is limited to only a small DC motor which has a short start-up time. In addition, the voltage-changeable supply circuit consisting of the switch and the resistor can not fully overcome the above problems.

SUMMARY OF THE INVENTION

An object of the present invention is to provide a DC motor drive system wherein a start-up current can be effectively reduced.

Another object of the present invention is to provide a DC motor drive system enabling a simple circuit construction, the reduction of production costs and an increased reliability, in addition to effectively reducing a start-up current of a DC motor.

In a DC motor drive system including a DC motor, a unit for detecting a rotation of a rotor of the motor, a power supply unit for supplying a drive power to the motor, and a current drive circuit operatively connected to a coil(s) of the motor and providing a constant current passing through the coil supplied with the drive power during a normal operation of the motor. According to the present invention the power supply unit receives a rotation signal from the rotational detecting unit, and sequentially increases a voltage therefrom in multi-steps in response to the increase of the rotation signal during a start-up operation of the motor. As a result, a current(s) passing through the current drive circuit is reduced during the start-up operation.

Preferably, the power supply unit may change the voltage therefrom in a stepwise manner so that a maximum value of the current is sequentially increased during the start-up.

The power supply unit may include a first power supply supplying a low voltage, a second power supply supplying a high voltage, a first switch circuit including a diode connected to the first power supply and supplying the low voltage to the coil at an initial condition, and at least one second switch circuit including a switching element connected to the second power supply and supplying the high voltage and reverse-biasing the diode when the second switch circuit is energized when the rotation exceeds a predetermined value.

The power supply may also include a first power supply supplying a voltage having a positive polarity, a second power supply supplying a voltage having a negative polarity, a first switching circuit operatively connected between a ground and the coil, and a second switching circuit operatively connected between the first power supply and the coil. The second power supply is operatively connected to the coil through the current drive circuit. The first switching circuit is energized to provide a low voltage defined by ground and the negative voltage at an initial condition so that a current defined by the low voltage flows between ground and the second power supply through the coil and the current drive circuit. The second switching circuit is energized to provide a high voltage defined by the positive voltage and the negative voltage when the rotation exceeds a predetermined value, so that a current defined by the high voltage flows between the first power supply and the second power supply through the coil and the current drive circuit.

BRIEF DESCRIPTION OF DRAWINGS

FIGS. 5a to 5c are waveform diagrams of voltages between coils in the DC motor shown in FIG. 2;

FIGS. 6a to 6c are waveform diagrams of currents through the coils in the DC motor shown in FIG. 2;

FIGS. 12a to 12j are timing charts of the operation of a speed detector shown in FIG. 11;

FIGS. 14a to 14e are circuit diagrams of another type of voltage-changeable power supply unit shown in FIG. 10;

DESCRIPTION OF THE PREFERRED EMBODIMENTS

A first embodiment of a DC motor drive system of the present invention, corresponding to the DC motor drive system shown in FIG. 1, will be described with reference to FIG. 2.

Figure 1:
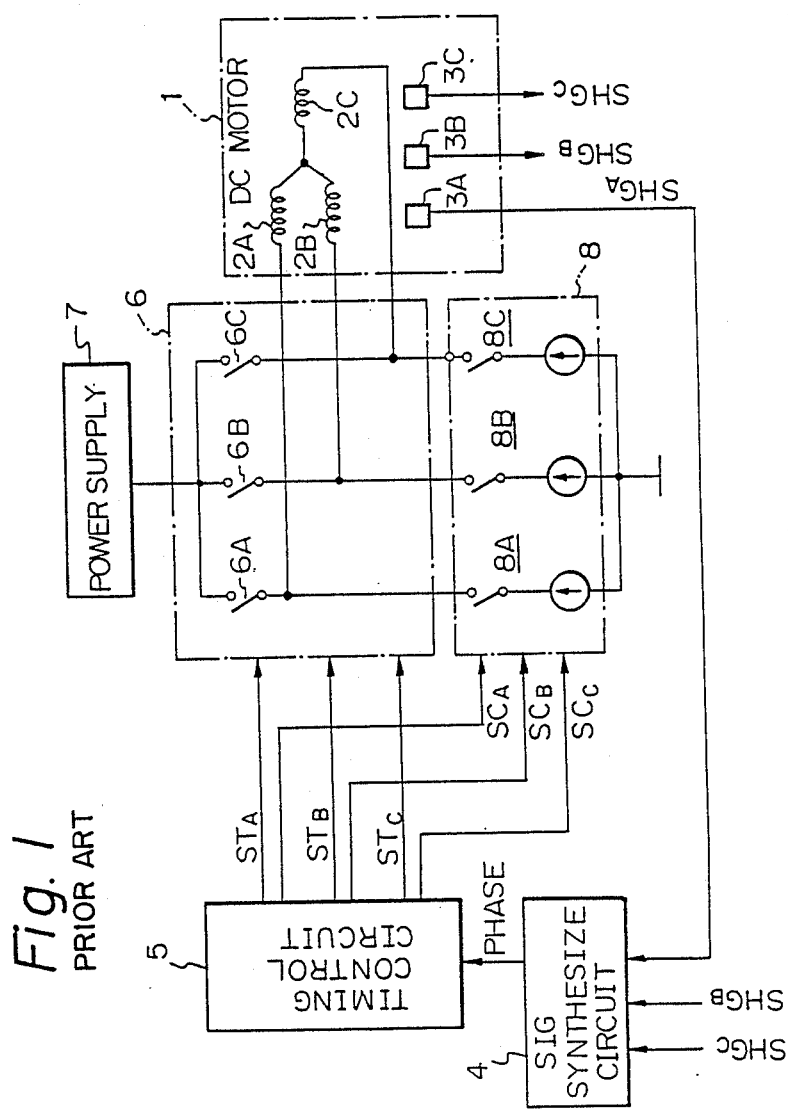
FIG. 1 is a circuit diagram of prior art DC motor drive system.
Figure 2:
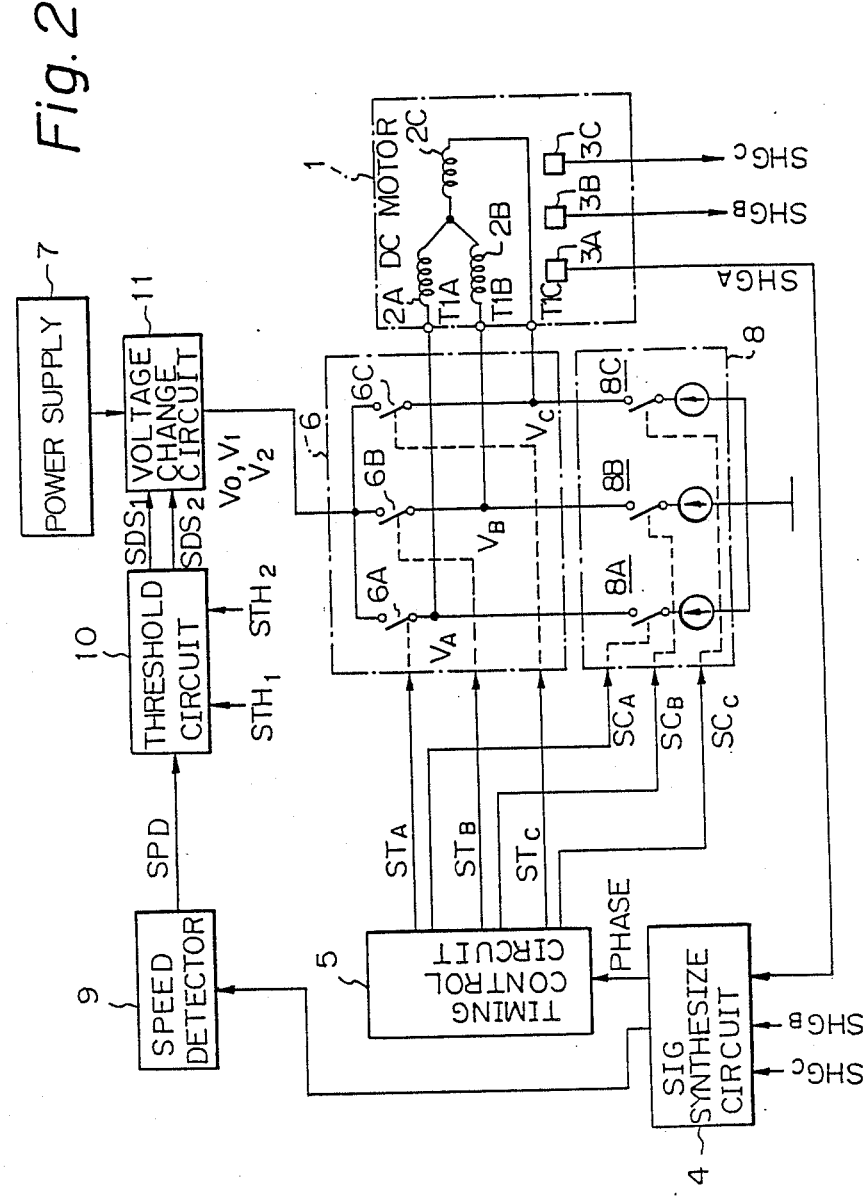
FIG. 2 is a circuit diagram of a first embodiment of a DC motor drive system in accordance with the present invention.

In FIG. 2, the DC motor drive system includes a speed detector 9, a threshold circuit 10 and a voltage change circuit 11, in addition to the bipolar brushless three phase DC motor 1 including the exciting coils 2A to 2C, the rotor and the Hall sensors 3A to 3C, the signal synthesizing circuit 4, the timing control circuit 5, the phase exchange switching circuit 6 having the power transistor type switches 6A to 6C, and the current drive circuit 8 having the constant current sources 8A to 8C, as shown in FIG. 1.

Figure 3:
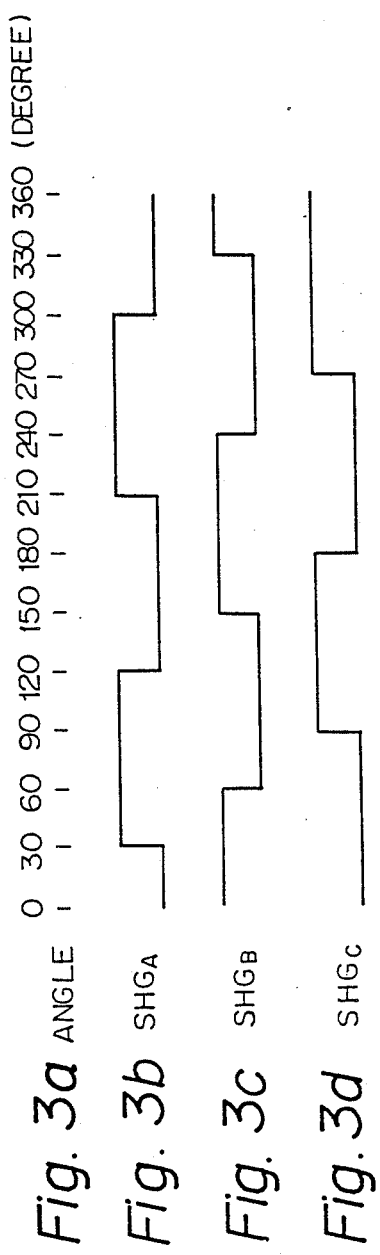
FIGS. 3a to 3d are waveforms of Hall sensor outputs in FIG. 2.

The Hall sensors 3A to 3C output the sensed signals $SHG_A$ to $SHG_C$ as shown in FIGS. 3b to 3d in response to a geometrical rotational angle of the rotor, as shown in FIG. 3a. The sensed signals $SHG_A$ to $SHG_C$ are synthesized at the signal synthesizing circuit 4. The synthesizing circuit 4 generates, on one hand, the phase signal SPHASE supplied to the timing control circuit 5, and on other hand, a source signal for detecting the rotational speed of the rotor at the speed detector 9.

The speed detector 9 detects the speed of the rotor on the basis of the source signal from the signal synthesizing circuit 4. The speed detector 9 can be realized as either a digital type speed detector or an analog type speed detector. The former may include a counter which counts the Hall sensed signal(s) $SHG_A$ to $SHG_C$ through the signal synthesizing circuit 4 for a predetermined period and outputs a counted value as the speed signal SPD. The latter may include a signal integrator which integrates the Hall sensed signal(s) through the signal synthesizing circuit 4 for a predetermined period and outputs an integrated voltage as the speed signal SPD.

The threshold circuit 10 receives the speed signal SPD from the speed detector 9 and outputs speed discrimination signals $SDS_1$ and $SDS_2$ in response to threshold values $STH_1$ and $STH_2$. The threshold values $STH_1$ and $STH_2$ correspond to speed $SPD_1$ and $SPD_2$ indicated on an abscissa in FIG. 4 and define three speed region steps; a low speed region, a middle speed region, and a high speed region. When the speed signal SPD is a counted value, the threshold circuit 10 may be realized by two digital comparators for outputting the speed discrimination signals $SDS_1$ and $SDS_2$, respectively. When the speed signal SPD is an analog voltage, the threshold circuit 10 may be realized by two analog comparators each of which may include an IC amplifier.

The voltage changeable circuit 11 receives a constant voltage from the power supply 7 and changes a voltage output therefrom in response to the speed discrimination signals $SDS_1$ and $SDS_2$. The voltage from the voltage changeable circuit 11 is known by a curve CV1 in FIG. 4. When both speed discrimination signals $SDS_1$ and $SDS_2$ are low level, i.e., when the rotor rotates at the low speed region in FIG. 4, the lowest voltage $V_0$ is selected and supplied to the exciting coils 2A to 2C and the constant current drive circuit 8 through the phase exchange switching circuit 6. When only the speed discrimination signal $SDS_1$ is high level, i.e., when the rotor is in the middle speed region, a middle voltage $V_1$ is output. Further, when the speed discrimination signal $SDS_2$ is high level, i.e., when the rotor is the high speed region, a rated voltage $V_2$ is output.

Figure 4:
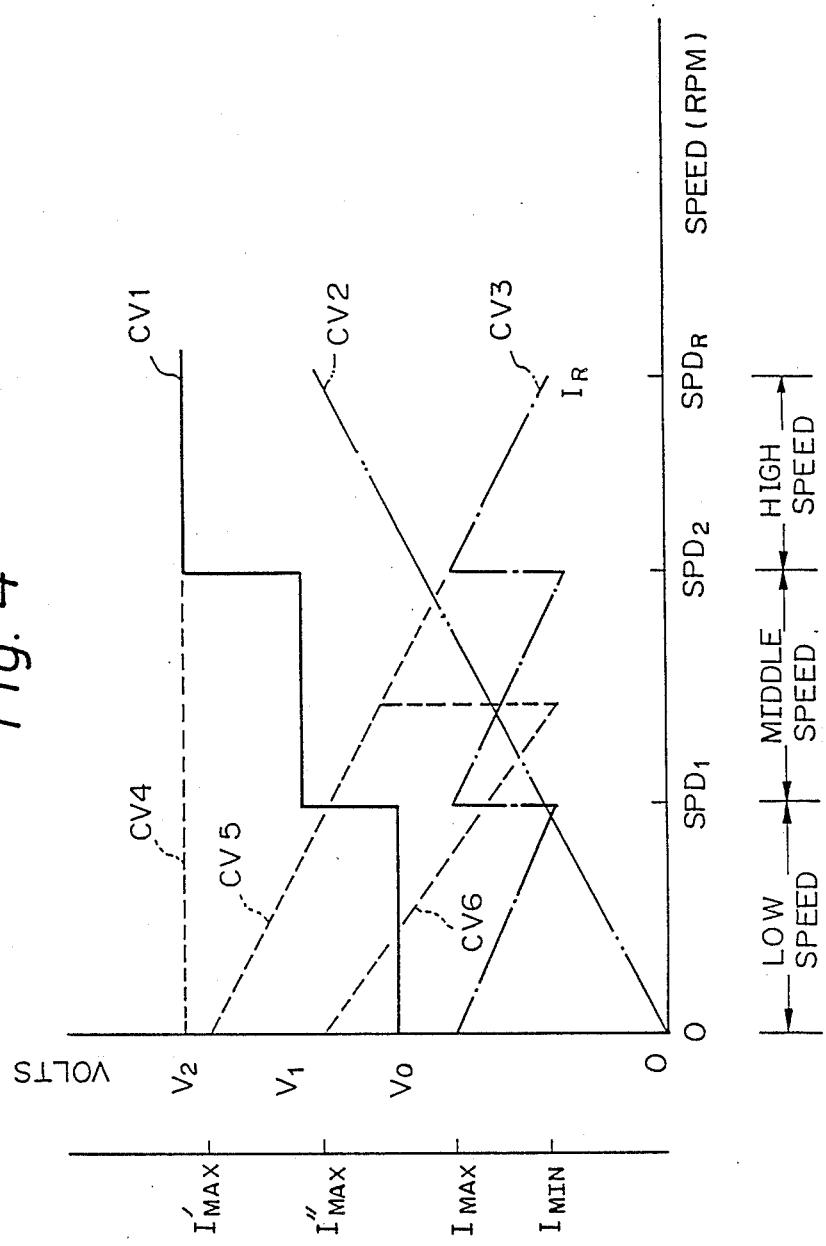
FIG. 4 is a graph of the operation of the DC motor drive system in FIG. 2.

In FIG. 4, an abscissa represents the rotor speed, wherein curve CV1 indicates the voltage output from the voltage changeable circuit 11. Curve CV2 indicates the counter-emf generated in the series-connected exciting coils of the DC motor 1. Curve CV3 indicates the current passing through the series-connected exciting coils. A dotted line CV4 indicates a constant rated voltage in the prior art, and another dotted line CV5 indicates the current passing through the series-connected exciting coils when the voltage shown by the line CV4 is supplied to the exciting coils. A first ordinate represents a current for curves CV3 and CV5, and a second ordinate represents a voltage for curves CV1, CV2 and CV4.

When a certain value of the voltage is supplied to the phase exchange switching circuit 6, a terminal voltage $V_A - V_B$ between output terminals of the power transistors switches 6A and 6B, i.e., between terminals T1A and T1B of the coils 2A and 2B, a terminal voltage $V_B - V_C$, and a terminal voltage $V_C - V_A$, are illustrated as shown in FIGS. 5a to 5c. Accordingly, a current $I_{2A}$ flowing into the coils 2A and 2B through the terminal T1A by energizing the power transistor switch 6A and the transistor(s) in the constant current source 8B in response to the timing signal $ST_A$ and the control signal $SC_B$ from the timing control circuit 5, respectively, i.e., a current passing through the constant current source 8B is shown in FIG. 6a. Similarly, a current $I_{2B}$ flowing into the coil 2B and a current $I_{2C}$ flowing into the coil 2C are shown in FIGS. 6b and 6c. Curves CV3 and CV5 indicate the amplitude of the current.

In FIG. 4, the counter-emf, as shown by curve CV2, at the coils is increased in response to the increase in the rotor speed. The current flowing into the series-connected coils, i.d., the current passing through the current source, is determined by the relationship expressed by formula (1). As described in the prior art, the voltage supplied to the phase exchange switching circuit 6 is constant rated voltage $V_2$ as shown by the dotted line CV4. The current therefor is shown by the dotted line CV5. As a result, an initial current at a zero speed is $I'_{MAX}$ in FIG. 4, which may be several tens of times greater than a current $I_R$ at a rated speed although the current drive circuit is provided. Note that an ordinate of the current is shown as a logarithmic scale. In the first prior art, the high initial current $I'_{MAX}$ causes a variety of problems as discussed above.

According to the above multiple change of the voltage supplied to the phase exchange switching circuit 6 as shown by curve CV1 in the embodiment of FIG. 2, an initial current defined by the lowest voltage $V_0$ is greatly reduced to $I_{MAX}$, as shown by curve CV3. The current is also reduced to $I_{MIN}$ in response to the increase of the rotation speed, i.e., the increase of the counter-emf. As the voltage is revised to $V_1$ at the speed $SPD_1$, the current is increase to a certain value smaller than $I_{MAX}$. The above phenomenon in the low speed region is repeated in the middle speed region and the high speed region. When the rotor speed reaches a rated speed, the current reaches a rated value $i_R$ defined by the formula (1) of the rated voltage $V_2$ as the voltage $V_M$ in the formula (1).

In the prior art disclosed in JPA No. 57-18321, a similar effect can be obtained. However, the prior art may not obtain a sufficiently low initial current because of a single voltage switching. More specifically, the rated current $I_R$ at the rated speed must be kept at a predetermined value, and the division of the speed range is rough. As a result, the current may be illustrated by curve CV6. An initial current may be $I''_{MAX}$ lower than $I'_{MAX}$, but much higher than $I_{MAX}$.

Since the current is reduced throughout all operating conditions in the embodiment, low rated switching elements in the phase exchange switching circuit 6 and the current drive circuit 8 can be used with a high reliability, and accordingly, the problems discussed above are overcome.

Figure 7:
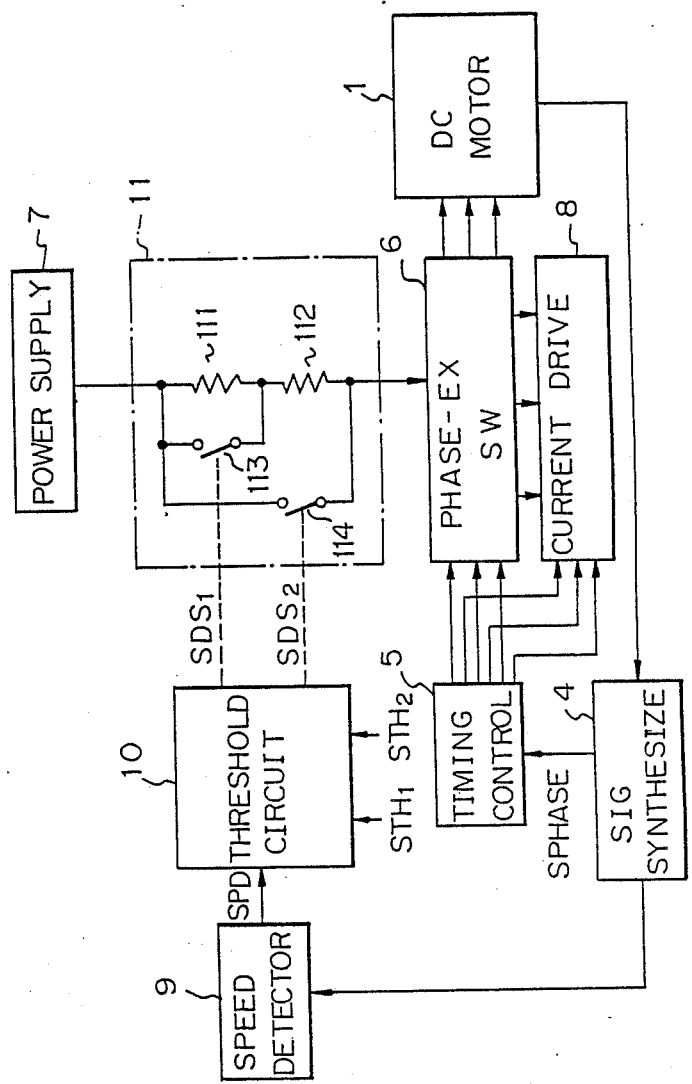
FIGS. 7 and 8 are circuit diagrams of second and third embodiments of a DC motor drive system in accordance with the present invention.

As shown in FIG. 7, the voltage changeable circuit 11 shown in FIG. 2 is realized by a circuit including series-connectable resistors 111 and 112 and power transistor switches 113 and 114. The power supply 7 outputs the rated voltage $V_2$. When the rotation speed is in the low speed region, the switches 113 and 114 are deenergized to connect the resistors 111 and 112 in series so that the lowest voltages $V_0$ is output therefrom. When the rotation speed is in the middle speed region, the switch 113 is energized to bypass the resistor 111 so that the middle voltage $V_1$ is output. When the rotation speed is in the high speed region, both switches 113 and 114 are energized to bypass both resistors 111 and 112, so that the rated voltage $V_2$ is output.

Figure 8:
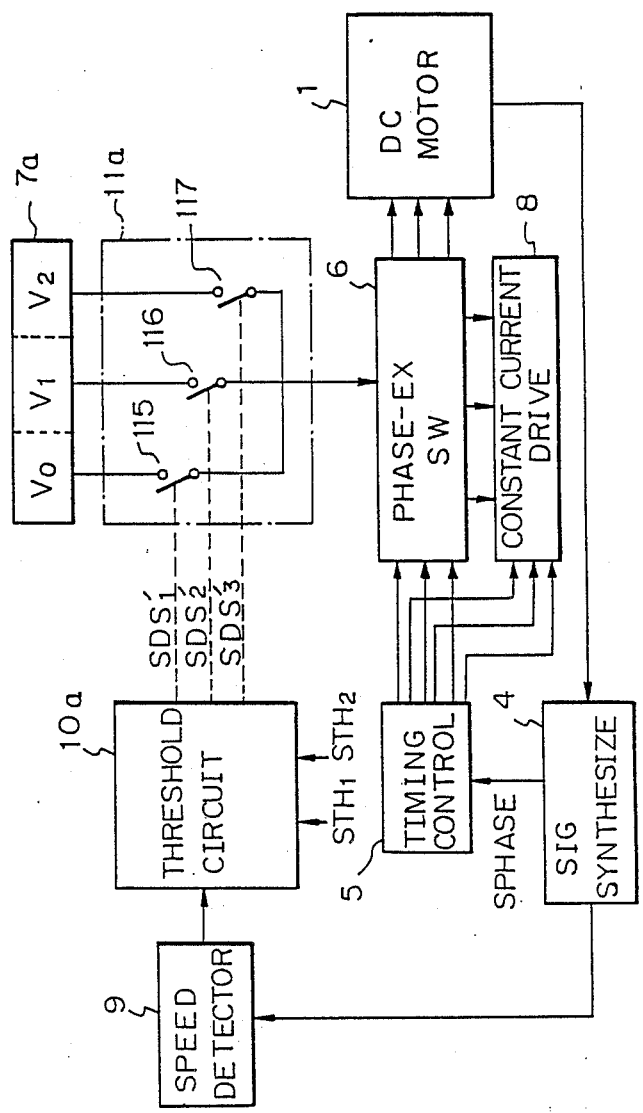

A modification of the system shown in FIG. 7 can be made as shown in FIG. 8. A power supply 7a provides voltages of $V_0$, $V_1$, and $V_2$. A voltage changeable circuit 11a includes three parallel-connected power transistor switches 115 to 117, and a threshold circuit 10a provides discrimination signals $SDS'_1$, $SDS'_2$, and SDS′3 for energizing the switches 115 to 117, respectively.

A multiple-step voltage switching greater than three, as shown in FIGS. 2, 7, and 8, is preferable.

In addition, the voltage switching circuits shown in FIGS. 7 and 8 can be combined to realize a multiple-step voltage switching.

Figure 9:
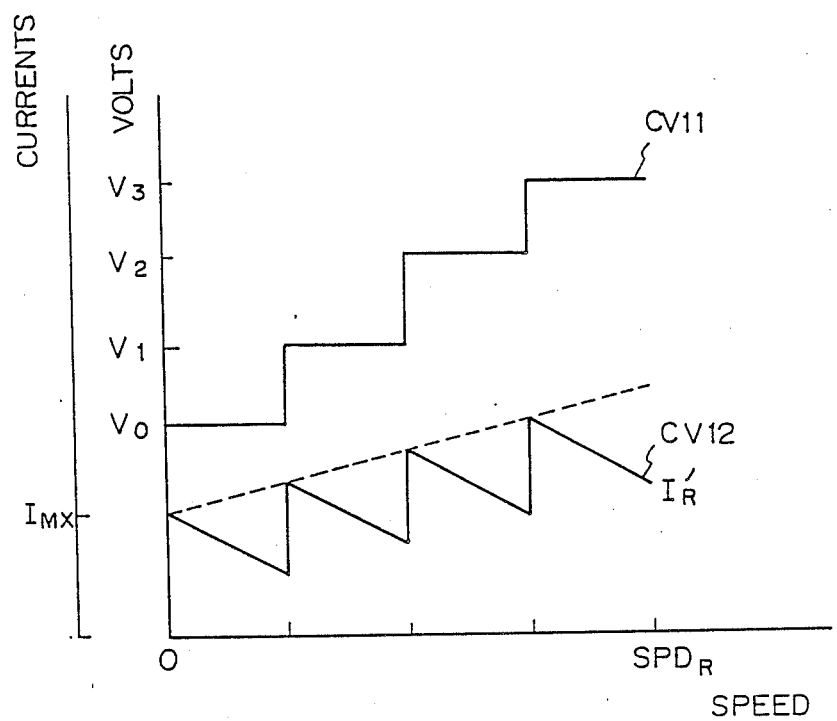
FIG. 9 is a graph of the operation of a DC motor drive system in accordance with the present invention.

As discussed above, the initial (or start-up) current should be as small as possible, from the viewpoint of reducing the load on the power transistors. This means that the low voltage $V_0$ must be as low as possible. On the other hand, the rated voltage supplied to the DC motor in the high speed region should be as high as possible, because the current (I) flowing in the coils of the DC motor becomes low, and accordingly, a loss in proportion to $I_2$ in the DC motor is reduced. FIG. 9 is a graph of the above features, wherein curve CV11 represents the voltage supplied to the DC motor and corresponds to curve CV1 shown in FIG. 4. The start-up voltage $V_0$ may be equal to that of FIG. 4, but the rated voltage $V_3$ is higher than the rated voltage $V_2$ of FIG. 4. Curve 12 represents the current flowing through the coils and corresponds to curve CV3 in FIG. 4. Note, the start-up current $I_{MX}$ may be equal to $I_{MAX}$ in FIG. 4, but the rated current $I'_R$ is lower than $I_R$ in FIG. 4.

From the above viewpoint, a multiple step voltage switching is preferable.

The resistors 111 and 112, the power supply 7 in FIG. 7, and the power supply 7a in FIG. 8 can be designed to meet the features discussed above.

Other embodiments of the DC motor drive system of the present invention will be more concretely described with reference to the drawings.

Figure 10:
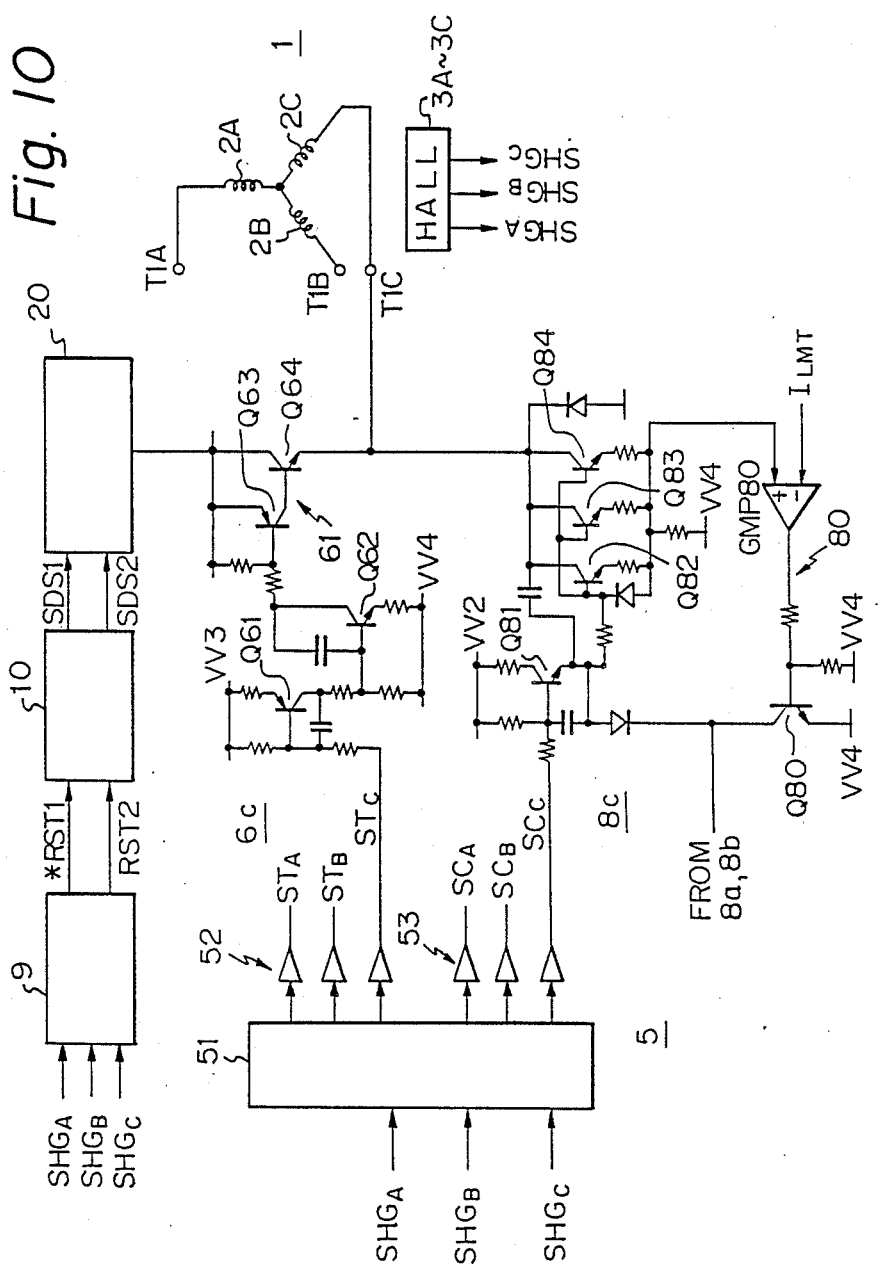
FIGS. 10 and 11 are detailed circuit diagrams of the second and third embodiments shown in FIGS. 7 and 8.

FIG. 10 is a circuit diagram of a DC motor drive system, but illustrated more specifically than the DC motor drive system shown in FIGS. 2, 7, and 8.

In FIG. 10, the same references as those used in FIGS. 2, 7 and 8 are used for the same components. Reference 20 denotes a voltage-changeable supply unit corresponding to the circuit combined with the power supply 7 or 7a and the voltage changable circuit 11 or 11a in FIGS. 2, 7, and 8. The signal synthesizing circuit 4 is omitted.

The timing control circuit 5 includes a decoder 51 receiving the sensed signals $SHG_A$ to $SHG_C$, a driver gate circuit 52 for outputting the phase exchange timing signals $ST_A$ to $ST_C$, and a driver gate circuit 53 for outputting the control signals $SC_A$ to $SC_C$. The decoder 51 generates the timing signals $ST_A$ to $ST_C$ and the control signals $SC_A$ to $SC_C$, in response to the sensed signals $SHG_A$ to $SHG_C$ indicating the rotational angle of the rotor.

To simplify the circuit diagram, a single power transistor type switch 6C in the power exchange switch circuit 6 and a single constant current source 8C in the constant current drive circuit 8, both connected to the coil 2C, are shown. The power transistor type switch 6C includes a transistor Q61, a transistor Q62 functioning as an operational amplifier and a Darlington circuit 61 including power transistors Q63 and Q64. The transistor Q61 is turned ON in response to the timing signal $ST_C$, to place the Darlington circuit 61 in an ON state through the transistor Q62, and to supply a voltage from the voltage-changeable supply unit 20. The constant current source 8C includes three parallel-connected power transistors Q82 to Q84, and a transistor Q81 functioning as an operational amplifier. The transistor Q81 is turned ON in response to the control signal $SC_C$ to energize the power transistors Q82 to Q84, so that constant currents flow therethrough during normal operation of the motor. The constant current drive circuit 8 includes a common current limiter 80 including a transistor Q80 and a comparator CMP80. The limiter 80 limits the currents passing through the power transistors Q82 to Q84 in the current source 8C to a limit value $I_{LMT}$ supplied to the comparator CMP80.

Figure 11:
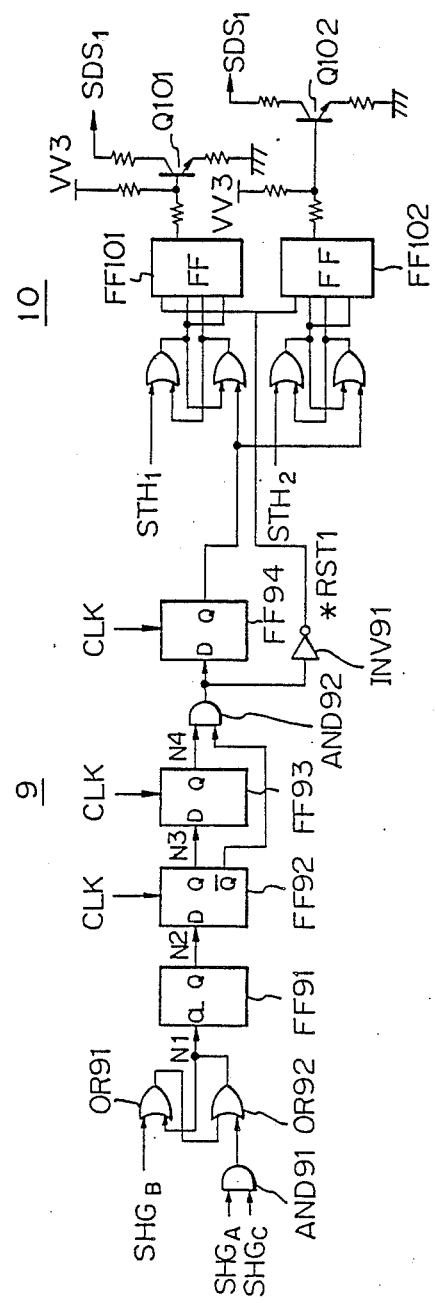

FIG. 11 is a circuit diagram of the speed detector 9 and the threshold circuit 10. The speed detector 9 includes an AND gate AND91 receiving the Hall signals $SHG_A$ and $SHG_C$, OR gates OR91 and OR92, series-connected flip-flops (FFs) FF91 to FF93, an AND gate AND92, and FF FF94, and an inverter INV91. A clock CLK is supplied to the delay-type FFs FF92 to FF94. Figures 12a to 12j are timing charts of the speed detector 9, and FIGS. 12e to 12h are views of signals at nodes N1 to N4. The speed detector 9 outputs signals *RST1 and RST2 indicating the rotation speed SPD.

The threshold circuit 10 includes four OR gates, two FFs FF101 and FF102, and output transistors Q101 and Q102. The threshold circuit 10 receives the speed signals *RST1 and RST2 and outputs the discrimination signals $SDS_1$ and $SDS_2$ to the voltage-changeable supply unit 20 in accordance with the threshold signals $STH_1$ and $STH_2$.

A variety of embodiments of the voltage-changeable supply unit 20 shown in FIG. 10 will be described with reference to FIGS. 13a to 13c, and FIGS. 14a to 14e.

Figure 13A:
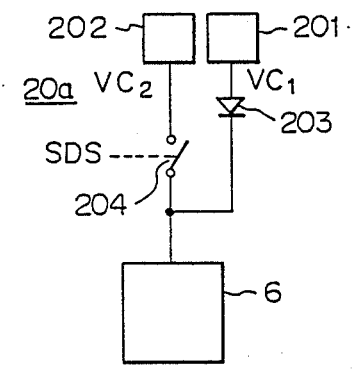
FIGS. 13a to 13c are circuit diagrams of a voltage-changeable power supply unit shown in FIG. 10.

In FIG. 13a, a voltage-changeable supply unit 20a includes a first power supply 201 supplying a constant voltage $VC_1$ corresponding to the lowest voltage $V_0$ shown in FIGS. 4 and 9, a second first power supply 202 supplying a constant voltage $VC_2$ corresponding to the rated voltage $V_2$ shown in FIG. 4, a diode 203, and a switch 204. The voltage supply unit 20a is connected to the phase exchange switching circuit 6. In an initial condition, the switch 204 is turned OFF and the voltage $VC_1$ from the power supply 201 is supplied to the phase exchange switching circuit 6. When the rotation speed exceeds a predetermined value, the discrimination signal SDS is output from the threshold circuit 10, turning the switch 204 ON. As a result, the doide 203 is reversebiased and automatically turned OFF because the voltage $VC_2$ is higher than the voltage $VC_1$, and the voltage $VC_2$ is supplied to the phase exchange switching circuit 6 through the switch 204. Compared with prior art reference JPA No. 57-183281, a power loss at the resistor in JPA No. 57-183281 is eliminated. In addition, the low cost and high reliability doide 203 reduces the size of the switch 115 shown in FIG. 8. The switches 204, and 115 to 117 shown in FIG. 8 must be constructed using a power transistor(s) and a relatively complex circuit, as shown by the switch circuit 6C including the Darlington connected power transistors Q63 and Q64, because a high voltage is supplied thereto and a large current is passed therethrough. Accordingly, the reduction of the size of the switch by providing the diode 203 provides a simple circuit construction and reduces the cost thereof.

Figure 13B:
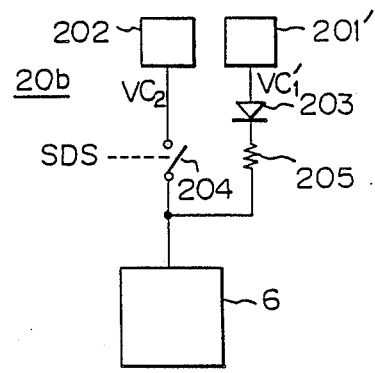

In FIG. 13b, a voltage-changeable supply unit 20b includes a resistor 205 in addition to the voltage supply unit 20a shown in FIG. 13a. The power supply 201′ also differs from the power supply 201 shown in FIG. 13a. Generally, a power supply is standardized to supply 12 VDC, 24 VDC, 48 VDC, etc. When the lowest voltage $V_0$ is 9 VDC, the power supply 201 shown in FIG. 13a is provided as a special power supply of 8 VDC. In FIG. 13b, the resistor 205 is designed to reduce the voltage of 12 VDC to 8 VDC. Accordingly, a standard, inexpensive power supply 201' having a voltage of 12 VDC is applicable.

Figure 13C:
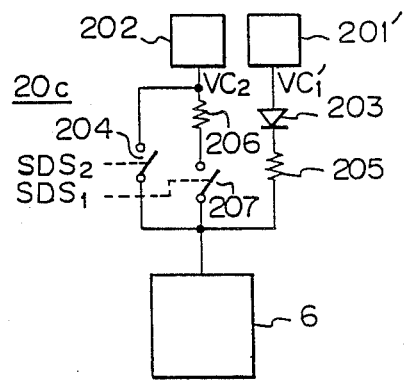

A voltage-changeable power supply unit 20c in FIG. 13c is a modification of the power supply unit 20b in FIG. 13b. The power supply 201', the diode 203 and the resistor 205 provide the voltage $V_0$ in the low speed region. The power supply unit 202 provides the voltage $V_2$, for example, 48 VDC, wherein a resistor 206 is designed to reduce the voltage $V_2$ to the voltage $V_1$ shown in FIG. 4. The power supply 202, the resistor 206, and a switch 207 provide the voltage $V_1$ in the middle speed region. The power supply 202 and the switch 204 provide the voltage $V_2$ in the high speed region. The power supply unit 20c functions in the same way as the circuits 7a and 11a, but one switch and one power supply are omitted in comparision with those circuits.

The power supply unit 20c is able to supply many more voltage levels. This is discussed in conjunction with the voltage change as shown by curve CV1 in FIG. 4. The voltage supply units may be designed to provide the voltage change as shown by curve CV11 in FIG. 9.

Another type of voltage-changeable power supply unit 20 will be desribed with reference to FIGS. 14a to 14e. The main feature of this type of voltage supply unit is the provision of a positive voltage power supply 211 and a negative voltage power supply 212 between the phase exchange switching circuit 6, the DC motor 1, and the constant current drive circuit 8. As described above, the voltage at the high speed operation should be as high as possible, to minimize power loss in the motor. However, a high voltage power supply is subject to strict requirements, such as safety regulations and very good insulation, and may be expensive. The positive voltage power supply 211 and the negative voltage power supply 212 share a high voltage and provide the high voltage therebetween. For example, when the high voltage is 48 VDC, the positive voltage power supply 211 provides +24 VDC and the negative voltage power supply 212 provides −24 VDC.

A voltage supply unit in FIG. 14a provides a low voltage between the ground and the negative voltage power supply 212 to the motor 1 through the phase exchange switching circuit 6 and the constant current drive circuit 8, when a switch 214 is energized by the discrimination signal $SDS_1$ in the low speed region. The voltage supply unit provides a high voltage between the positive voltage power supply 211 and the negative voltage power supply 212 to the motor 1, when a switch 213 is energized and the switch 214 is deenergized in the high speed region.

A voltage supply unit shown in FIG. 14b provides three voltages: a low voltage between the ground and the power supply 212, a high voltage between the power supplies 211 and 212, and a middle voltage lower than the high voltage by a voltage drop at a resistor 215. The switches 214, 216 and 213 are consecutively energized in response to the rotational speed of the motor 1.

A voltage supply unit shown in FIG. 14c includes a diode 217 and a resistor 218 instead of the switch 214 in FIG. 14a. The operational functions of the diode 217, the resistor 218, and the switch 213 are similar to those shown in FIG. 13b.

A voltage supply unit shown in FIG. 14d is combined with the voltage supply units shown in FIGS. 14b and 14c. This voltage supply unit also supplies three voltages.

The voltage supply unit shown in FIG. 14e is a modification of the voltage supply unit in FIG. 14d. In the middle speed region, the switch 216 is energized to reverse-bias the diode 217 and to series-connect a resistor 219 and the resistor 218. The resistor 218 is used not only in the low speed region but also in the middle speed region. The resistor 219 can be smaller than the resistor 215 in FIG. 14d, and thus the voltage supply unit in FIG. 14e is more economical than the voltage supply unit in FIG. 14d.

In the above embodiments, switching elements as the switches for the power transistor type switch 6c in FIG. 10, the current source 8c in FIG. 10, the switch 204 in FIG. 13a, and the switches 213 and 214 in FIG. 14a are power transistors. As shown in FIG. 10, the power transistor is generally used to ground the emitter and the output from the collector.

Figure 15A:
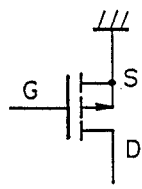
FIGS. 15a and 15b are power MOS-FETs applicable to the circuits shown in the embodiments.
Figure 15B:
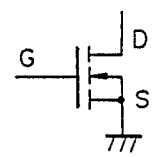

The switching elements can be replaced by other switching elements, for example, power MOS-FETS. Generally, a MOS-FET is used to ground a source (S) as shown in FIGS. 15a and 15b. The MOS-FET is FIG. 15a can be used as a phase exchange switch instead of the phase exchange switching circuit 6C in FIG. 10. The MOS-FET in FIG. 15b can be used as a constant current source instead of the constant current source 8c in FIG. 10.

A recent technological advance in the MOS-FET field enables practical use of a power MOS-FET having a low ON-resistance and operable by low gate voltage, such as a TTL voltage level. As an impedance of a gate of the power MOS-FET is very high, a gate current is very low, resulting in a low power consumption, and a simple circuit construction.

Figure 16A:
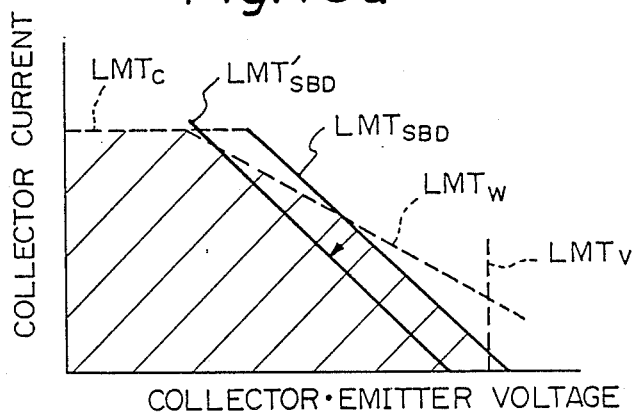
FIGS. 16a and 16b are graphs of the characteristics of a power bipolar transistor and a power MOS-FET used in the circuits of the embodiments.
Figure 16B:
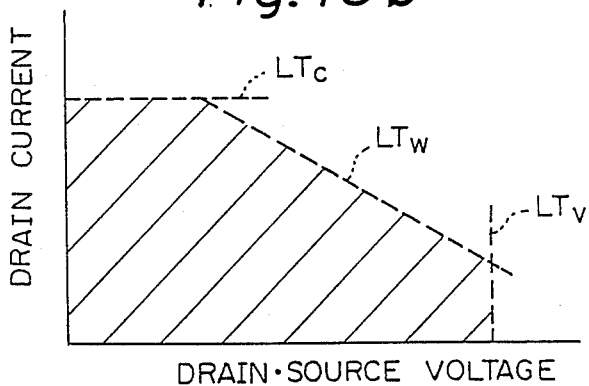

In addition, the MOS-FET is not subjected to a second break down limitation in a bipolar transistor. FIG. 16a is a graph illustrating the characteristics of the bipolar transistor. The performance of the bipolar transistor is limited by a current limit shown by a dotted line $LMT_C$, a limit of a collector emitter voltage $V_{CE}$ shown by a dotted line $LMT_V$, and a wattage limit shown by a dotted line $LMT_W$. The bipolar transistor is further limited by the second break down limitation of a junction shown by a solid line $LMT_{SBD}$, to prevent thermal dissipation. As a result, an effective region of the bipolar transistor for actual use is limited to that shown as a shaded region. The second break down limitation greatly depends on the temperature thereat. If the temperature rises, the second break down limitation is increased as shown by a line $LMT'_{SBD}$, further narowing the effective use region. Conversely, the MOS-FET is not subjected to the above second break down limitation as shown in FIG. 16b, because the MOS-FET does not have a junction. In FIG. 16b, an abscissa represents a drain source voltage and an ordinate represents a drain current. Lines $LT_C$, $LT_W$, and $LT_V$ indicate a current limitation, a wattage limitation, and a voltage limitation. A shaded portion indicates an effective use region.

Figure 17:
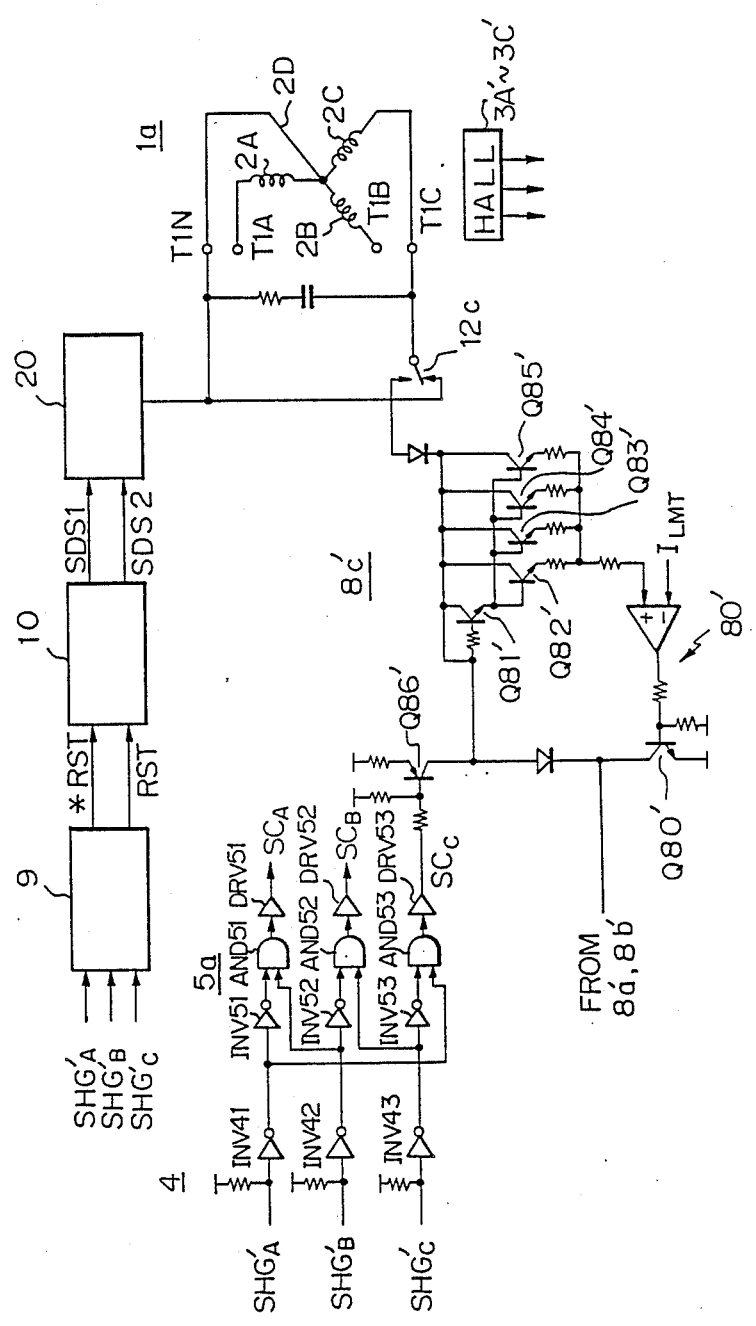
FIG. 17 is a circuit diagram of still another embodiment of a DC motor drive system in accordance with the present invention.

FIG. 17 is a diagram of another type of a DC motor drive system.

In FIG. 17, a DC motor 1a is a unipolar type brushless motor having a neutral line 2D, exciting coils 2A to 2C corresponding to those in FIG. 10, and Hall sensors 3A' to 3C'. The signal synthesizing circuit 4 receives Hall sensed signals $SHG'_A$ to $SHG'_C$ and outputs inverted-signals as a phase signal through inverters INV41 to INV43. The timing control circuit 5a includes inverters INV51 to INV53, AND gates AND51 to AND53, and drivers DRV51 to DRV53. The timing control circuit 5a outputs control signals $SC_A$ to $SC_C$ to a constant current drive circuit wherein only one current source 8c' and a current limiter 80' are illustrated. The current source 8c' is similar to the current source 8c shown in FIG. 10. The current source 8c' includes a transistor Q86', a transistor Q81' functioning as an operational amplifier, and four parallel-connected power amplifiers Q82; to Q85'.

The speed detector 9, the threshold circuit 10, and the voltage supply unit 20 are substantially the same as to those described above.

Note that the phase exchange switching circuit 6 in FIG. 10 is not necessary.

Figure 18:
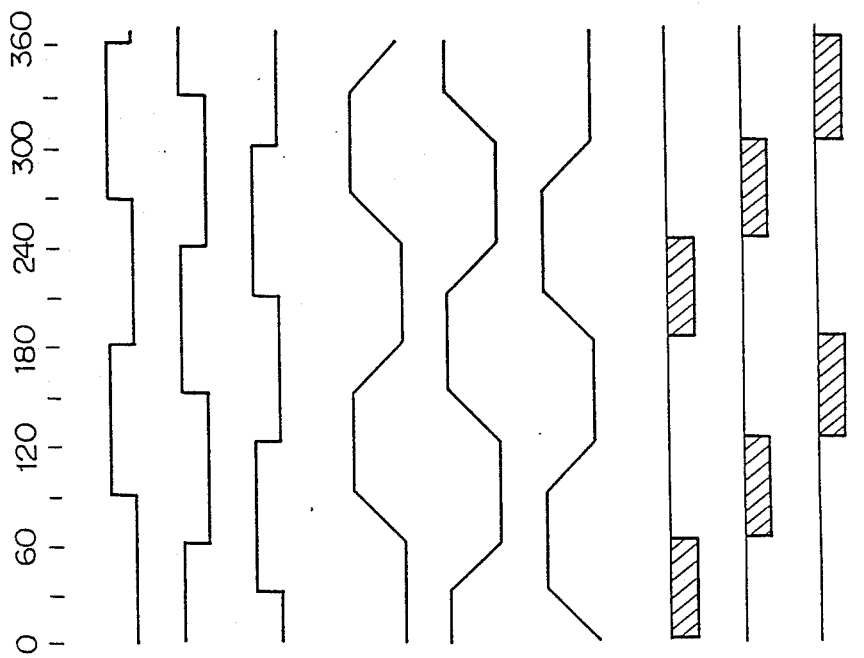
FIGS. 18a to 18i are timing charts representing the operation of the DC motor drive system shown in FIG. 17.

FIGS. 18a to 18i are timing charts illustrating the operation of the DC motor drive system in FIG. 17. FIGS. 18a to 18c are waveform diagrams of the Hall sensor's outputs $SHG'_C$ to $SHG'_A$, FIGS. 18d to 18f are waveform diagrams of voltages between the neutral line, and the coils 2C, 2B and 2A, respectively, and FIGS. 18g to 18i are currents $I_C$ to $I_A$ flowing into the coils 2C, 2B and 2C. During the shaded time, the currents flow into the coils through the constant current driver circuits 8a', 8b' (not shown), and 8c'.

The power MOS-FETS also can be used in the circuit shown in FIG. 17.

In the above embodiments, the DC motor drive system for driving the Hall-type motor is a brushless DC motor. The DC motor drive system of the present invention obviously can be applied to drive other types of brushless DC motors in MR devices, magnetic saturation devices, photo-interruptors, etc.

The DC motor drive system can be applied not only to brushless DC motors but also to brush-type DC motors deiven by a constant current drive circuit and requiring a reduction of the start-up current.

Figure 19:
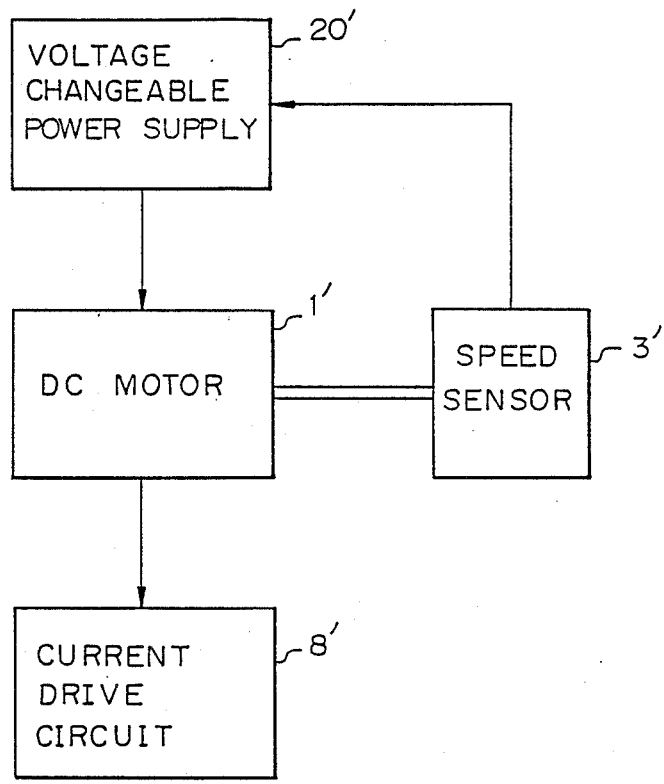
FIG. 19 is a block diagram of yet another embodiment of a DC motor drive system in accordance with the present invention.

FIG. 19 is a block diagram of a brush type DC motor drive system. The drive system includes a voltage changeable power supply unit 20', a brush type DC motor 1', a speed sensor 3', such as a tacho-generator mechanically connected to a rotor shaft of the DC motor 1', and a constant current drive circuit 81. Here, phase exchange switching is not necessary. The voltage changeable supply unit 20; receives a speed signal from the speed sensor 3' and outputs a variety of voltage steps in response to the rotor speed. The current drive circuit 8' can be realized by the circuits discussed above.

The DC motor drive system of the present invention is applicable to a variety of systems using DC motors, such as a magnetic disc drive system. Preferably, the DC motor drive system is applied to a DC motor drive having a constant current drive circuit and maintaining a constant torque regardless of a load change on the DC motor.

We claim:

1. A direct-current motor drive system comprising:
 a DC motor;
 means, connected to said DC motor, for detecting a rotation of a rotor of said DC motor and outputting a rotational signal;
 power supply means, connected to said DC motor, for supplying drive power to said DC motor;
 current drive means, operatively connected to a coil of said DC motor and providing a constant current passing through said coil supplied with the drive power during a normal operatin of said DC motor, said power supply means receiving the rotational signal from said rotational detecting means, and sequentially increasing a voltage therefrom in multi-steps in response to the increase of the rotational signal during a start-up operation of said DC motor, a current defined by said voltage and passing through said current drive means being reduced to a value less than a predetermined value.

2. A DC motor drive system according to claim 1, wherein said power supply means includes means for stepwisely changing said voltage in response to the increase of the rotational signal so that a maximim value of said current defined by said voltage in each step and passing through said current drive means is sequentially increased during said start-up operation.

3. A DC motor drive system according to claim 2, wherein said current drive means comprises:
 at least one current drive circuit, each said current drive circuit including:
 at least one power switching element operatively connected to said coil and providing the constant current passing through said coil during said normal operation, the current passing through said power switching element being increased in response to the increase of said rotational signal during said start-up operation.

4. A DC motor drive system according to claim 3, wherein each said current drive circuit further comprises an operational amplifier for driving said power switching element.

5. A DC motor drive system according to claim 4, wherein said power supply means comprises at least two switching circuits connected in parallel, each of said switching circuits being energized to provide a predetermined rotation range different from a rotation range for the other switching circuit, by providing a voltage different from another voltage from said other switching circuit.

6. A DC motor drive system according to claim 5, wherein each said switching circuit comprises a power switching element operating between a fully turned-ON state and fully turned-OFF state.

7. A DC motor drive system according to claim 6, wherein said DC motor is a brushless-type DC motor, including a plurality of exciting coils,
 wherein said current drive circuits are respectively operatively connected to said exciting coils, and
 wherein said DC motor drive system further comprises timing control means, connected to said rotational detecting means, for receiving the rotational signal, determining a rotational phase and consecutively generating a plurality of control signals to said respective current drive circuits.

8. A DC motor drive system according to claim 6, wherein said DC motor is a brushless, phase exchange type DC motor including a plurality of exciting coils,
 wherein said current drive circuits are respectively operatively connected to said exciting coils, and
 wherein said DC motor drive system further comprises:
 phase exchange means including a plurality of switching circuits, each operatively connected to said power supply means, said respective current drive circuits and said respective exciting coils providing a rotational force to said rotor when energized; and timing control means, connected to said rotational detecting means, said switching circuits and said current drive circuits, for receiving the rotational signal, determining a rotational phase, and consecutively outputting a plurality of timing signals to said respective switching circuits in said phase exchange means and a plurality of control signals to said respective current drive circuits.

9. A DC motor drive system according to claim 8, wherein each said switching circuit in said phase exchange means comprises a power switching element which operates between a fully turned-ON state and a fully turned-OFF state.

10. A DC motor drive system according to claim 3, wherein each of said power switching elements comprises a power bipolar-transistor.

11. A DC motor drive system according to claim 3, wherein each of said power switching elements comprises a power MOS-FET.

12. A system for driving a direct-current motor including a rotor, at least one exciting coil and means for detecting a rotation of the rotor, comprising:
   power supply means, connected to the motor, for supplying a drive power to the motor; and
   current drive means, operatively connected to the coil and providing a constant current passing through the coil supplied with the drive power during a normal operation state of the motor,
   said power supply means including:
   a first power supply supplying a low voltage;
   a second power supply supplying a high voltage, higher than the low voltage;
   a first switch circuit including a diode, connected to said first power supply and supplying the low voltage to the coil at an initial condition; and
   at least one second switch circuit including a first switching element, connected to said second power supply and supplying the high voltage and reverse-biasing said diode when said second switch circuit is energized when rotation of said rotor exceeds a predetermined value.

13. A system according to claim 12, wherein said second switch circuit comprises a second switching element connected between said second power supply and a phase exchange means.

14. A system according to claim 13, wherein said first power supply comprises a conventional power supply (201') for supplying a standard voltage, and
   wherein said first switch circuit includes a resistor connected in series to said diode, for supplying said low voltage to the coil from said first power supply.

15. A system according to claim 14, wherein said second switch circuit further comprises at least one or more switching circuits connected in parallel to said first switching element, each of said switching circuits including a circuit having a third switching element connected in series with a resistor, and supplying a voltage between said low voltage and said high voltage, said voltage being different for each of said at least one or more switching circuits, and wherein the voltages from said power supply means being such that one of said voltages is output in response to rotation of the motor and sequentially increasing to a maximum value of the current passing through said current drive means, determined by said output voltage in response to the increase in rotation of the motor.

16. A system according to claim 13, wherein said second switch circuit fruther comprises:
   at least one or more switching circuits connected in parallel to said first switching element, each of said at least one or more switching circuits including:
   a third switching element; and
   a resistor, connected in series with said third switching element, said second switching element and said resistor supplying a voltage between said low voltage and said high voltage, said voltage being different for each of said at least one or more switching circuits, and wherein the voltages from said power supply means being such that one of said voltages is output in response to rotation of the motor and sequentially increasing to a maximum value of the current passing through said current drive means, determined by said output voltage in response to the increase in rotation of the motor.

17. A system according to claim 13, wherein each of said switching elements comprises a power bipolar transistor.

18. A system according to claim 13, wherein each of said switching elements comprises a power MOS-FET.

19. A system for driving a direct current motor including a rotor, at least one exciting coil, and means, connected to the rotor, for detecting a rotation of the rotor, said system comprising:
   power supply means, connected to the motor, for supplying a drive power to the motor; and
   current drive means, operatively connected to the coil and providing a constant current passing through the coil supplied with the drive power during a normal operation state of the motor, said power supply means including:
   a first power supply supplying a positive voltage;
   a second power supply supplying a negative voltage;
   first switching means, operatively connected between ground and the coil, for switching between ground and the coil; and
   second switching means, operatively connected between said first power supply and the coil, for switching between said first power supply and the coil, said second power supply operatively connected to the coil through said current drive means, said first switching means being energized at an initial condition to provide a low voltage defined by ground and said negative voltage of said second power supply so that a current defined by said low voltage flows between ground and said second power supply through the coil and said current drive means, and
   said second switching means being energized to provide a high voltage defined by said positive voltage of said first power supply when rotation of the motor exceeds a predetermined value so that the current defined by said high voltage flows between said first power supply and said second power supply through the coil and said current drive means.

20. A system acording to claim 19, wherein said first switching means comprises a first switching element, being energized at said initial condition, so that the current, defined by a voltage between ground and said negative voltage of said second power supply, flows through the coil and said current drive means, and being deenergized when the rotation of the motor exceeds the predetermined value.

21. A system according to claim 20, wherein said second switching means comprises a second switching element being energized when the rotation of the motor exceeds the predetermined value.

22. A system according to claim 21, wherein said second switching means further comprises at least one or more switching circuits connected in parallel to said second switching element, each of said switching circuits including:
   a third switching element; and
   a resistor, connected in series with said third switching element, supplying a voltage between said low voltage and said high voltage, said voltage being different for each of said at least one or more switching circuits, wherein the voltages from said power supply means being defined such that one of said voltages is output in response to rotation of the motor and sequentially increasing to a maximum value of the current passing through the coil and said current drive means, in response to the increase in rotation of the motor.

23. A system according to claim 22, wherein said first switching means comprises a diode having an anode operatively connected to ground.

24. A system according to claim 23, wherein said second power supply comprises a conventional power supply for supplying a standard voltage, and
   wherein a first one of said at least one or more switching circuits includes a resistor connected in series with said diode to supply said low voltage to the coil and to said current drive means from said standard voltage.

25. A system according to claim 21, wherein each of said switching elements comprises a power bipolartransistor.

26. A system according to claim 21, wherein each of said switching elements comprises a power MOS-FET.

* * * * *

UNITED STATES PATENT AND TRADEMARK OFFICE
CERTIFICATE OF CORRECTION

PATENT NO. : 4,879,498

DATED : NOVEMBER 7, 1989

INVENTOR(S) : TOORU SHINOHARA ET AL.

It is certified that error appears in the above-identified patent and that said Letters Patent is hereby corrected as shown below:

Col. 1, line 30, "disc)s)" should be --disc(s)--.

Col. 5, line 27, "known" should be --shown--.

Col. 6, line 6, "i.d.," should be --i.e.,--;
       line 26, "revised" should be --raised--;
       line 27, "increase"' should be --increased--.

Col. 8, line 15, "and" should be --an--;
       line 68, "9" should be --8--.

Col. 9, line 28, "desribed" should be --described--.

Col. 10, line 25, "is" should be --in--;
        line 53, "narowing" should be --narrowing--.

Col. 11, line 13, "Q82;" should be --Q82'--;
        line 39, "deiven" should be --driven--;
        line 46, "81." should be --8',--;
        line 48, "20;" should be --20',--.

UNITED STATES PATENT AND TRADEMARK OFFICE
CERTIFICATE OF CORRECTION

PATENT NO. : 4,879,498

DATED : NOVEMBER 7, 1989

INVENTOR(S) : TOORU SHINOHARA ET AL.

It is certified that error appears in the above-identified patent and that said Letters Patent is hereby corrected as shown below:

Col. 12, line 44, after "and" insert --a--.

Col. 14, line 2, "fruther" should be --further--.

Signed and Sealed this

Fourth Day of September, 1990

Attest:

HARRY F. MANBECK, JR.

*Attesting Officer*  *Commissioner of Patents and Trademarks*